United States Patent
Wang et al.

(10) Patent No.: US 11,734,276 B2
(45) Date of Patent: Aug. 22, 2023

(54) METHOD AND APPARATUS FOR UPDATING SEARCH CACHE TO IMPROVE THE UPDATE SPEED OF HOT CONTENT

(71) Applicant: Beijing Qiyi Century Science & Technology Co., Ltd., Beijing (CN)

(72) Inventors: Hongpeng Wang, Beijing (CN); Aiyun Chen, Beijing (CN); Ting Yao, Beijing (CN)

(73) Assignee: BEIJING QIYI CENTURY SCIENCE & TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/311,657

(22) PCT Filed: Aug. 25, 2017

(86) PCT No.: PCT/CN2017/099116
§ 371 (c)(1),
(2) Date: Dec. 19, 2018

(87) PCT Pub. No.: WO2018/120876
PCT Pub. Date: Jul. 5, 2018

(65) Prior Publication Data
US 2019/0310986 A1    Oct. 10, 2019

(30) Foreign Application Priority Data
Dec. 29, 2016  (CN) .................. 201611251539.X

(51) Int. Cl.
*G06F 16/245* (2019.01)
*G06F 16/2455* (2019.01)
(Continued)

(52) U.S. Cl.
CPC .... *G06F 16/24552* (2019.01); *G06F 16/2393* (2019.01); *G06F 16/951* (2019.01); *G06F 16/953* (2019.01); *G06F 16/9574* (2019.01)

(58) Field of Classification Search
CPC .......... G06F 16/24552; G06F 16/2393; G06F 16/951; G06F 16/953; G06F 16/9574; G06F 16/24539
See application file for complete search history.

(56) References Cited

U.S. PATENT DOCUMENTS 5,915,249 A     6/1999  Spencer
6,484,161 B1 *  11/2002 Chipalkatti ............ G06Q 30/02
(Continued)

FOREIGN PATENT DOCUMENTS

CN    102693308 A  *  9/2012
CN    102902730 A     1/2013
(Continued)

OTHER PUBLICATIONS

Extended European Search Report dated Oct. 2, 2019 for European Application No. 17886503.6; 8 pgs.
(Continued)

*Primary Examiner* — Pierre M Vital
*Assistant Examiner* — Andrew N Ho
(74) *Attorney, Agent, or Firm* — Umberg Zipser LLP

(57) ABSTRACT

Embodiments of the present application provide a method and apparatus for updating search cache, which relate to the technical field of multimedia. The method comprises: when hot content is updated, extracting a first search term corresponding to information of the hot content, and updating the first search term to a first database; when a search request is received, querying a pre-established first database according to a search term in the search request and determining whether a second search term is obtained; when the second
(Continued)

search term is obtained and determined to be valid, querying a pre-established second database according to the second search term to obtain cache of a first search result; determining whether the cache of the first search result is valid; if yes, taking the information in the cache of the first search result as a first search request result; if no, forwarding the search request to a search engine, obtaining a second search request result and updating the second search request result into the second database. By applying embodiments of the present application, the update speed of hot content can be improved.

18 Claims, 6 Drawing Sheets

(51) Int. Cl.
*G06F 16/953* (2019.01)
*G06F 16/23* (2019.01)
*G06F 16/957* (2019.01)
*G06F 16/951* (2019.01)

(56) References Cited

U.S. PATENT DOCUMENTS

| | | | | |
|---|---|---|---|---|
| 6,941,310 | B2 * | 9/2005 | Ahad | G06F 16/24552 |
| 6,976,090 | B2 | 12/2005 | Ben-Shaul et al. | |
| 7,454,571 | B1 * | 11/2008 | Sucharitakul | G06F 16/24552 711/129 |
| 8,577,992 | B1 | 11/2013 | Richardson et al. | |
| 8,938,526 | B1 | 1/2015 | Richardson et al. | |
| 8,949,535 | B1 * | 2/2015 | Hunter | G06F 11/073 711/119 |
| 2002/0194168 | A1 * | 12/2002 | Min | G06F 16/951 |
| 2003/0061451 | A1 * | 3/2003 | Beyda | G06F 16/9574 711/137 |
| 2003/0105744 | A1 * | 6/2003 | McKeeth | G06F 16/951 |
| 2004/0249682 | A1 * | 12/2004 | DeMarcken | G06Q 10/02 705/5 |
| 2004/0249798 | A1 * | 12/2004 | Demarcken | G06Q 10/02 |
| 2005/0192935 | A1 * | 9/2005 | Rajamani | G06F 16/24552 |
| 2006/0271510 | A1 * | 11/2006 | Harward | G06F 9/526 |
| 2009/0164790 | A1 | 6/2009 | Pogodin | |
| 2009/0287671 | A1 | 11/2009 | Bennett | |
| 2012/0150831 | A1 * | 6/2012 | Sun | G06F 16/951 707/706 |
| 2014/0280028 | A1 * | 9/2014 | Ding | G06F 16/2393 707/717 |
| 2014/0304288 | A1 * | 10/2014 | Stymne | G06F 12/0866 707/758 |
| 2016/0019254 | A1 * | 1/2016 | Vijayrao | G06F 16/235 707/737 |

FOREIGN PATENT DOCUMENTS

| | | | | |
|---|---|---|---|---|
| CN | 102915380 | A | | 2/2013 |
| CN | 102915380 | A * | 2/2013 | |
| CN | 102982023 | A | | 3/2013 |
| CN | 103186350 | A | | 7/2013 |
| CN | 103853831 | A | | 6/2014 |
| CN | 103902579 | A | | 7/2014 |
| CN | 103902610 | A * | 7/2014 | |
| CN | 103186350 | B * | 3/2016 | ............... G06F 3/06 |
| CN | 103186350 | B | | 3/2016 |
| CN | 105677924 | A | | 6/2016 |
| CN | 106682202 | A | | 5/2017 |
| CN | 105373347 | B * | 6/2018 | ....... G06F 16/24552 |
| EP | 1244016 | A1 * | 9/2002 | .......... G06F 11/3438 |
| JP | 2007299292 | A | | 11/2007 |
| JP | 2010128806 | A | | 6/2010 |
| JP | 2012048280 | A | | 3/2012 |
| JP | 2013196566 | A | | 9/2013 |
| KR | 101387914 | B1 | | 4/2014 |
| KR | 20160046545 | A | | 4/2016 |
| KR | 1020160117678 | A | | 10/2016 |

OTHER PUBLICATIONS

First Office Action of Japanese Patent Application No. 2019-503741 dated Feb. 12, 2020; 4 pgs.
First Office Action of Korean Patent Application No. 10-2019-7002505 dated Jan. 9, 2020; 7 pgs.
Office Action for Canadian Patent Application No. 3,028,839 dated Nov. 19, 2019; 5 pgs.
Notification of Decision to Grant for Korean Application No. 10-2019-7002505 dated Jul. 20, 2020; 4 pgs.
European Patent Office, Second Office Action, Application No. 17 886 503.6-1213, dated Aug. 5, 2021, 8 pages.
Chen et al., "TI: An Efficient Indexing Mechanism for Real-Time Search on Tweets," Proceedings of the 2011 ACM Sigmod International Conference on Management of Data; Jun. 12-16, 2011; Athens, Greece, ACM, New York, NY, USA, Jun. 12, 2011; pp. 649-660; 12 pages.
European Patent Office, European Application No. 17886503.6; Summons to attend oral proceedings pursuant to Rule 115(1) EPC; Sep. 21, 2022; 10 pages.
Alici et al, "Timestamp-based Result Cache Invalidation for Web Search Engines" SIGIR'11, Jul. 2011 pp. 973-982.
Chen et al., "TI: An Efficient Indexing Mechanism for Real-Time Search on Tweets" SIGMOD'11, Jun. 2011, pp. 649-660.
European Patent Office, Office Action dated May 16, 2023.

* cited by examiner

US 11,734,276 B2

METHOD AND APPARATUS FOR UPDATING SEARCH CACHE TO IMPROVE THE UPDATE SPEED OF HOT CONTENT

The present application claims the priority to a Chinese patent application No. 201611251539.X, filed with State Intellectual Property Office of PRC on Dec. 29, 2016 and entitled "METHOD AND APPARATUS FOR UPDATING SEARCH CACHE", which is incorporated herein by reference in its entirety.

TECHNICAL FIELD

The present application relates to the technical field of multimedia, and particularly to a method and apparatus for updating search cache.

BACKGROUND

With continuous development of search, continuous upgrading and updating of hot content and continuous increase of search volume, search cache is an essential factor for improving the performance and stability of search services. Cache is a temporary file exchange area, and is a memory for high-speed data exchange. It exchanges data with CPU prior to a memory, so the speed is very high. In order to increase the response speed to a user's query, cache has almost become a standard configuration for search engines. In a search engine, search results of key terms of some hot content will be put into a cache, and when these key terms are searched again, the search results can be directly invoked from the cache without any need to retrieve and rank in an index database again. The introduction of caching mechanism not only increases the response speed of search engines to users' searches, but also reduces repeated calculation of data by the search engines.

However, for hot content, when there is updated information, during the valid period of cache content, the relevant information of the latest hot content cannot be displayed on a page of search results in time.

SUMMARY OF THE INVENTION

The objective of embodiments of the present application is to provide a method and apparatus for updating search cache, so as to improve the update speed of hot content. The specific technical solutions are as follows.

An embodiment of the present application discloses a method for updating search cache, comprising:

when hot content is updated, extracting a first search term corresponding to information of the hot content, and updating the first search term into a pre-established first database, wherein, the first database stores a search term of hot content;

when a search request is received, querying the first database according to a search term in the search request and determining whether a second search term is obtained;

when the second search term is obtained and determined to be valid, querying a pre-established second database according to the second search term to obtain cache content of a first search result, wherein, the second database stores cache content of a search result; and determining whether the cache content of the first search result is valid; if the cache content of the first search result is valid, taking information in the cache content of the first search result as a first search request result; if the cache content of the first search result is not valid, forwarding the search request to a search engine, obtaining a second search request result and updating the second search request result into the second database.

Optionally, before extracting a first search term corresponding to information of the hot content and updating the first search term into a first database, the method for updating search cache further comprises:

receiving a message queue of the hot content, and updating the search term corresponding to the message queue into the first database.

Optionally, the method for updating search cache further comprises:

when the second search term is obtained and determined to be not valid, forwarding the search request to the search engine, obtaining a third search request result and updating the third search request result into the second database.

Optionally, determining that the second search term is valid comprises:

determining a first difference between a timestamp of obtaining the second search term and a timestamp of writing the second search term;

if the first difference is smaller than a first preset valid period, determining that the second search term is valid; and determining whether the cache content of the first search result is valid comprises:

determining a second difference between a timestamp of obtaining the cache content of the first search result and a timestamp of writing the cache content of the first search result; and determining whether the cache content of the first search result is valid according to whether the second difference is smaller than a second preset valid period.

Optionally, determining that the second search term is not valid comprises:

determining a first difference between a timestamp of obtaining the second search term and a timestamp of writing the second search term;

if the first difference is larger than or equal to a first preset valid period, determining that the second search term is not valid.

Optionally, the method for updating search cache further comprises:

when the second search term is not obtained, querying the second database according to the search request to obtain cache content of a second search result and determining whether the cache content of the second search result is valid;

if the cache content of the second search result is valid, taking information in the cache content of the second search result as a fourth search request result;

if the cache content of the second search result is not valid, forwarding the search request to the search engine, obtaining a fifth search request result and updating the fifth search request result into the second database.

Optionally, determining whether the cache content of the second search result is valid comprises:

determining a third difference between a timestamp of obtaining the cache content of the second search result and a timestamp of writing the cache content of the second search result; and determining whether the cache content of the second search result is valid according to whether the third difference is smaller than a third preset valid period.

Optionally, after taking information in the cache content of the first search result as a first search request result, the method for updating search cache further comprises:

returning the first search request result to a search request client; or after obtaining the second search request result, the method for updating search cache further comprises:

returning the second search request result to a search request client; or after obtaining the third search request result, the method for updating search cache further comprises:

returning the third search request result to a search request client; or after taking information in the cache content of the second search result as a fourth search request result, the method for updating search cache further comprises:

returning the fourth search request result to a search request client; or after obtaining the firth search request result, the method for updating search cache further comprises:

returning the fifth search request result to a search request client.

An embodiment of the present application further discloses an apparatus for updating search cache, comprising:

a search term updating module, used to, when hot content is updated, extract a first search term corresponding to information of the hot content, and update the first search term into a pre-established first database, wherein, the first database stores a search term of hot content;

a search term determining module, used to, when receiving a search request, query the first database according to a search term in the search request and determine whether a second search term is obtained;

a first cache obtaining module, used to, when the second search term is obtained and determined to be valid, query a pre-established second database according to the second search term to obtain cache content of a first search result, wherein, the second database stores cache content of a search result;

a first cache determining module, used to determine whether the cache content of the first search result is valid;

a first search request result obtaining module, used to, when the first cache determining module determines that the cache content of the first search result is valid, take information in the cache content of the first search result as a first search request result; and a second search request result obtaining module, used to, when the first cache determining module determines that the cache content of the first search result is not valid, forward the search request to a search engine, obtain a second search request result and update the second search request result into the second database.

Optionally, the apparatus for updating search cache according to the embodiment of the present application further comprises:

a search term establishing module, used to receive a message queue of the hot content and update a search term corresponding to the message queue into the first database.

Optionally, the apparatus for updating search cache according to the embodiment of the present application further comprises:

a third search request result obtaining module, used to, when the second search term is obtained and determined to be not valid, forward the search request to the search engine, obtain a third search request result and update the third search request result into the second database.

Optionally, the first cache obtaining module comprises:

a first difference determining sub-module, used to determine a first difference between a timestamp of obtaining the second search term and a timestamp of writing the second search term; and a second search term validity determining sub-module, used to determine that the second search term is valid if the first difference is smaller than a first preset valid period; and the first cache determining module comprises:

a second difference determining sub-module, used to determine a second difference between a timestamp of obtaining the cache content of the first search result and a timestamp of writing the cache content of the first search result; and a first cache validity determining sub-module, used to determine whether the cache content of the first search result is valid according to whether the second difference is smaller than a second preset valid period.

Optionally, the third search request result obtaining module comprises:

a first difference determining sub-module, used to determine a first difference between a timestamp of obtaining the second search term and a timestamp of writing the second search term; and a second search term invalidity determining sub-module, used to determine that the second search term is not valid if the first difference is larger than or equal to a first preset valid period;

Optionally, the apparatus for updating search cache according to the embodiment of the present application comprises:

a second cache obtaining module, used to, when the second search term is not obtained, query the second database according to the search request to obtain cache content of a second search result;

a second cache determining module, used to determine whether the cache content of the second search result is valid;

a fourth search request result obtaining module, used to, when the second cache determining module determines that the cache content of the second search result is valid, takes information in the cache content of the second search result as a fourth search request result; and a fifth search request result obtaining module, used to, when the second cache determining module determines that the cache content of the second search result is not valid, forward the search request to the search engine, obtain a fifth search request result and update the fifth search request result into the second database.

Optionally, the second cache determining module comprises:

a third difference determining sub-module, used to determine a third difference between a timestamp of obtaining the cache content of the second search result and a timestamp of writing the cache content of the second search result; and a second cache validity determining sub-module, used to determine whether the cache content of the second search result is valid according to whether the third difference is smaller than a third preset valid period.

Optionally, the apparatus for updating search cache according to the embodiment of the present application further comprises:

a first search request result returning module, used to return the first search request result to a search request client; or a second search request result returning module, used to return the second search request result to a search request client; or a third search request result returning module, used to return the third search request result to a search request client; or a fourth search request result returning module, used to return the fourth search request result to a search request client; or a fifth search request result returning module, used to return the fifth search request result to a search request client.

An embodiment of the present application discloses an electronic device, which comprises a processor, a communication interface, a memory and a communication bus, wherein, the processor, the communication interface and the memory communicate with each other via the communication bus;

the memory is used to store an application program; and the processor is used to execute the application program stored in the memory, so as to perform the steps of the method for updating search cache described above.

An embodiment of the present application discloses an application program for performing the steps of the method for updating search cache described above when being executed.

An embodiment of the present application discloses a storage medium. The storage medium is used to store an application program for performing the steps of the method for updating search cache described above when being executed.

In the method and apparatus for updating search cache according to the embodiments of the present application, when hot content is updated, a first search term corresponding to information of the hot content is updated into a first database. When a search request is received, a pre-established first database is queried according to a search term in the search request, wherein the valid time of a search term of hot content is longer than that of cache content of a search result of hot content, and thus when the second search term obtained is determined to be valid, cache content of the search result corresponding to the second search term may be still within the valid period or has already passed the valid period; a pre-established second database is queried according to the second search term to obtain cache content of a first search result; when cache content of the first search result is valid, information in cache content of the first search result is taken as a first search request result; when cache content of the first search result is not valid, the search request is forwarded to a search engine, a second search request result is obtained and the second search request result is updated into the second database, which ensures that cache content of hot content is updated in time. In this way, since the valid time of a search term of hot content is longer than that of cache content of a search result of hot content, by applying the method for updating search cache according to embodiments of the present application, the update speed of hot content can be improved such that information of hot content is newer and it is convenient for users to view the latest information. Of course, the implementation of any product or method of the present application does not necessarily achieve all the advantages described above at the same time.

BRIEF DESCRIPTION OF THE DRAWINGS

In order to describe the technical solutions in embodiments of the present application or in the prior art more clearly, a brief introduction will be given below for the drawings required for the description of embodiments or the related art.

DETAILED DESCRIPTION OF THE INVENTION

Figure 1:
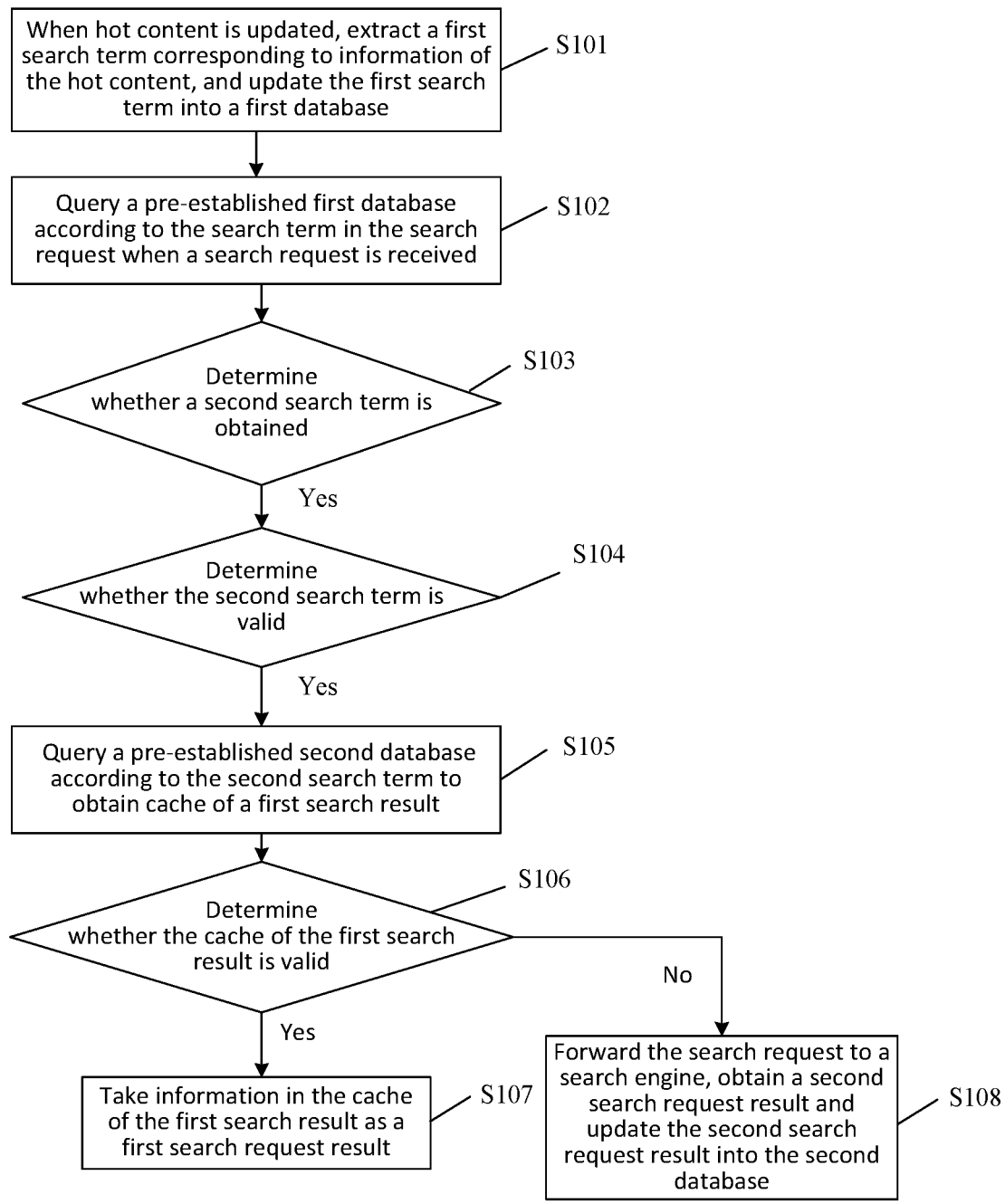
FIG. 1 is a flowchart of a method for updating search cache according to an embodiment of the present application.

The technical solutions in embodiments of the present application will be described below in conjunction with the accompanying drawings in embodiments of the present application.

With the development of Internet technology, more and more attention is paid to the search technology. Among users' search requests, a minority of search terms account for a considerable portion of the search requests while a majority of search terms do not frequently appear alone, and as a result, search engines store search results of a minority of search terms that are frequently searched by users into caches, which can deal with most of the user's search requests. Cache content of each search result has its valid period, and the latest related information cannot be displayed in time on a page of search results during the valid period of the cache content of the search result. The longer the valid period of the cache content of the search result is, the higher a hit ratio of the cache content is. If the valid period of the cache content of the search result is reduced, the hit ratio of the cache content of the search result can be reduced and update speed can be thereby improved. However, there are no strong requirements on the update speed of some non-hot contents. Thus, in case that the valid period of search cache content is not reduced, the update speed of hot content is low.

Cache content of each search result has its valid period, and the cache content of the search result cannot be updated during the valid period of the cache content of the search result. The cache content is re-obtained and updated via a search engine only if the valid period of the cache content of the search result expires, that is, the cache content of the search result is not valid and cannot be used.

Here, if the valid period of the cache content of the search result is long, when a search request is received, the cache content of the search result is very likely to be within the valid period and thus valid. In this case, the cache content of the search result can be obtained quickly, i.e., the hit ratio of the cache content is high. If the valid period of the cache content of the search result is short, when the search request is received, the cache content of the search result is very likely to pass the valid period and thus is not valid. In this case, it is needed to re-obtain and update cache content via the search engine, i.e., the hit ratio of the cache content is low.

Besides, a longer valid period of the cache content of the search result leads to a smaller frequency of the cache content being re-obtained and updated via the search engine and a slower update speed of the cache content. A shorter valid period of the cache content of the search result leads to a higher frequency of the cache content being re-obtained and updated via the search engine and a faster update speed of the cache content. The update speed of the hot content is faster, while the update speed of some non-hot content is lower. If the valid period of the cache content is suitable for the update speed of the non-hot content, it is not suitable for the hot content in the case that the valid period of search cache content is not reduced, and the update speed of the cache content is lower for the hot content.

An embodiment of the present application discloses a method for updating search cache, which may improve the update speed of the hot content. Reference is made to FIG. 1, and FIG. 1 is a flowchart of a method for updating search cache according to an embodiment of the present application. The method comprises the following steps S101-S108.

In S101, when hot content is updated, a first search term corresponding to information of the hot content is extracted, and the first search term is updated into a first database, wherein, the first database stores a search term of hot content.

The hot content herein can be preset, and can also be determined according to update frequency. For example, a frequency threshold is set. If an update frequency of a piece of information exceeds the frequency threshold, it is determined that this information is hot content. If the update frequency of a piece of information fails to exceed the frequency threshold, it is determined that this information is non-hot content.

The search term of hot content can also be preset. For example, hot content is a presidential election of a country, and the search term is set to include a plurality of terms such as presidential election of this country, names of presidential candidates and the like. If a piece of information is searched, term segmentation is performed on the information and the terms obtained after the term segmentation is matched with the preset search terms. If the terms obtained after the term segmentation include one or more preset search terms, it is determined that the one or more search terms included in the terms obtained after the term segmentation are the first search term and this information is the hot content.

It can be understood that each piece of information, especially hot information has a corresponding key term, and in daily life, users can obtain desired relevant information by key term search. In an embodiment of the present application, information of hot content also has a corresponding term, i.e., a search term. When hot content is updated, a first search term corresponding to the information of the hot content is extracted and the first search term is updated into a first database. The hot content refers to hot news currently concerned by people, which can be current affairs, politics, sports events, entertainment and gossip, life services, and so on. The information of the hot content can be video information, picture information, text information or the like.

Terms corresponding to the information of the hot content described above can be obtained by performing term segmentation on the information of the hot content, and each term corresponding to the information of the hot content can be used as a key term, i.e., search term.

For example, if current hot content is presidential election of a country, the latest news about the presidential election of this country will continuously appear on the Internet. Search terms corresponding to each piece of information may be presidential election of this country, names of presidential candidates and the like. A first search term is one or more terms of presidential election of this country, names of presidential candidates and the like, and the first search term is updated into the first database, so that data in the first database is updated in real time.

In S102, when a search request is received, the first database is queried according to a search term in the search request.

In S103, it is determined whether a second search term is obtained.

The second search term is a search term in the search request stored in the first database.

Specifically, search terms of hot content are stored in the first database. When a search request is received, the first database is queried according to the search term in the search request. It is determined whether this search request is a search request for hot content or a search request for non-hot content by querying whether the search term in the search request are included in the first database. When a second search term is obtained, it is indicated that the search request is the search request for hot content; otherwise, it is indicated that the search request is the search request for non-hot content. For example, the search term in the search request is the name of a hit TV drama, and the second search term obtained by querying the first database is the name of this hit TV drama.

When the second search term is obtained, S104 is performed, i.e., it is determined whether the second search term is valid.

When the second search term is determined to be valid, S105 is performed, i.e., a pre-established second database is queried according to the second search term to obtain cache content of a first search result, wherein, the second database stores cache content of a search result.

The cache content of the search result herein is information stored. The valid time of a search term of hot content stored in the first database is longer than that of cache content of a search result of hot content stored in the second database.

It should be noted that, when a second search term is obtained, it is only indicated that the search request is a search request for hot content. However, in practice, the search term has a certain valid period. That is to say, hot content is different in different periods. When a search term is still within a valid period, it is indicated that information corresponding to this search term is still hot content. When the search term passes the valid period, it is indicated that this search term has already not been a search term for hot content. In this step, when a second search term is obtained and determined to be valid, it is indicated that the second search term is still within a valid period and information corresponding to this second search term is still hot content. Then cache content of the first search result may be obtained by querying the second database directly according to the second search term. Cache content of a search result is stored in the second database, and when a search request, especially a search request for hot content, is received, a search result can be obtained quickly by a search term of hot content and cache content of a search result without any need to search through a search engine, which improves search efficiency.

In S106, it is determined whether the cache content of the first search result is valid.

When the cache content of the first search result is valid, S107 is performed, i.e., information in the cache content of the first search result is taken as a first search request result. When the cache content of the first search result is not valid, S108 is performed, i.e., the search request is forwarded to a search engine, a second search request result is obtained and the second search request result is updated into the second database.

Specifically, like search terms, the cache content of a search result has a valid period. Cache content of a search result can be returned as a search request result only during the valid period of the cache content of the search result. If cache content of the first search result is valid, i.e., cache content of the first search result is within the valid period, the cache content of the first search result can be returned as a search request result, i.e., information in the cache content of the first search result is used as a first search request result. However, when cache content of the first search result is not valid, i.e., cache content of the first search result passes the valid period, it is needed to forward the search request to a search engine and obtain a second search request result through the search engine. Meanwhile, it is needed to update the second search request result into a second database such that data in the second database is kept up-to-date, and thus when the same search request is received next time, the search request result can be obtained directly from the second database.

For example, the second search term is the name of a hit TV drama, and cache content of the first search result obtained is cache content of this hit TV drama. If the cache content of this hit TV drama is still within the valid period, information in the cache content of this hit TV drama can be used as the first search request result. If the cache content of this hit TV drama passes the valid period, it is needed to obtain a second search request result through a search engine according to the name of this hit TV drama, and the second search request result is information on this hit TV drama returned by the search engine.

Generally, the valid period of a search term of hot content stored in the first database is much longer than that of cache content of a search result stored in the second database. If a search term is still within the valid period, cache content of a search result corresponding to the search term may be within the valid period or has already passed the valid period. If cache content of the search result corresponding to the search term has already passed the valid period, the latest information of this hot content is obtained through a search engine, and cache content of the search result corresponding to the search term is updated in time, which improves update speed of hot content. If a search term has already passed the valid period, which indicates that cache content of a search result corresponding to the search term have certainly passed the valid period, the latest information of this hot content may be obtained through a search engine and cache content of the search result corresponding to the search term may be updated, or the latest information of this hot content may be not obtained through a search engine and cache content of the search result corresponding to the search term may be not updated.

It can be seen that in the method for updating search cache provided by the embodiment of the present application, a search term of hot content is updated into a first database in time; when a search request is received, the first database is queried according to the search term in the search request, wherein the valid time of a search term of hot content is longer than that of cache content of a search result of hot content, and thus when a second search term obtained is determined to be valid, cache content of the search result corresponding to the second search term may be still within the valid period or has already passed the valid period; a pre-established second database is queried according to the second search term to obtain cache content of a first search result; when cache content of the first search result is valid, information in cache content of the first search result is taken as a first search request result; and when cache content of the first search result is not valid, the search request is forwarded to a search engine, a second search request result is obtained and the second search request result is updated into the second database, which ensures that cache content of hot content is updated in time. In this way, since the valid time of a search term of hot content is longer than that of cache content of a search result of hot content, by applying the method for updating search cache according to the embodiment of the present application, the update speed of hot content can be improved such that information of hot content is newer and it is convenient for users to view the latest information.

Figure 2:
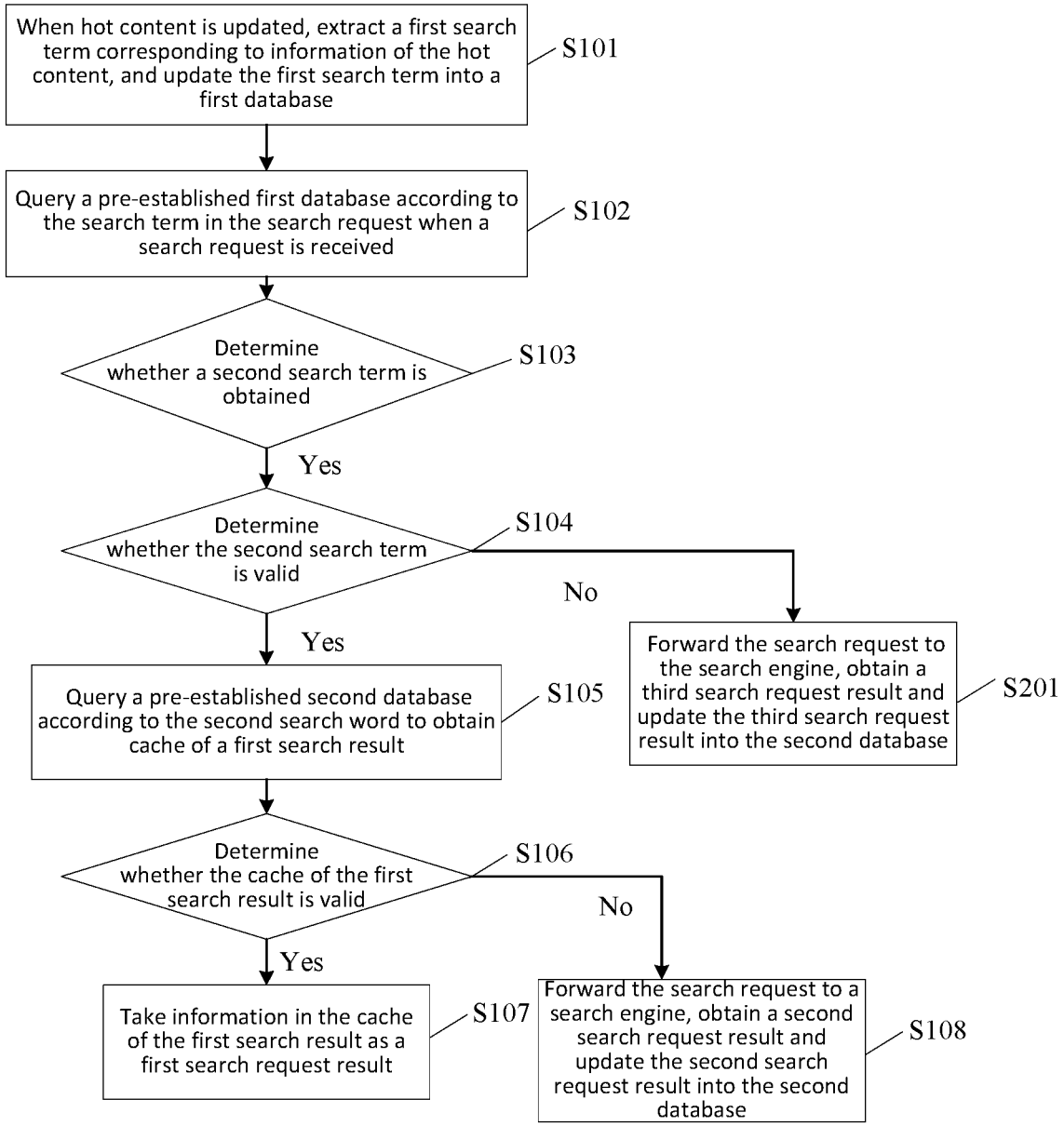
FIG. 2 is another flowchart of a method for updating search cache according to an embodiment of the present application.

Referring to FIG. 2, which is another flowchart of a method for updating search cache according to an embodiment of the present application, on the basis of the embodiment of FIG. 1, the method for updating search cache according to the embodiment of the present application further comprises step S201.

In S201, when the second search term is obtained and determined to be not valid, the search request is forwarded to the search engine, a third search request result is obtained and the third search request result is updated into the second database.

In this step, when it is determined that a second search term is not valid, which indicates that this search term is already not a search term of hot content, the search request is forwarded to the search engine, a third search request result and the third search request result is updated into the second database. The processing in this step is identical to S108 and will not be described repeatedly here.

Figure 3:
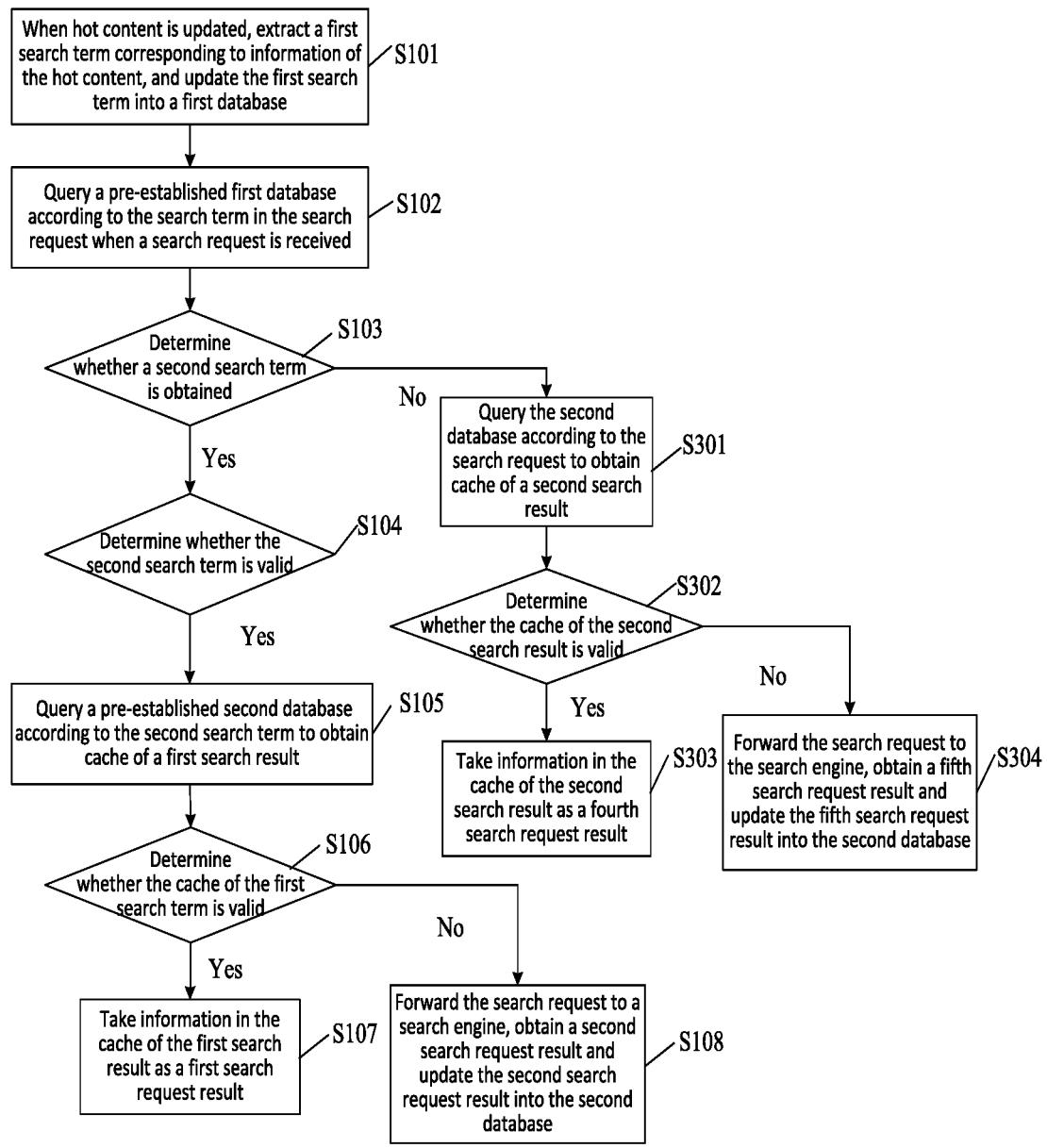
FIG. 3 is another flowchart of a method for updating search cache according to an embodiment of the present application.

Referring to FIG. 3, which is another flowchart of a method for updating search cache according to an embodiment of the present application, on the basis of the embodiment of FIG. 1, the method for updating search cache according to the embodiment of the present application further comprises steps S301-S304.

In S301, when the second search term is not obtained, the second database is queried according to the search request to obtain cache content of a second search result.

In S302, it is determined whether the cache content of the second search result is valid.

When it is determined in S302 that the cache content of the second search result is valid, S303 is performed, i.e., the information in the cache content of the second search result is taken as a fourth search request result. When it is determined in S302 that the cache content of the second search result is not valid, the search request is forwarded to the search engine, a fifth search request result is obtained and the fifth search request result is updated into the second database.

In an embodiment of the present application, when a second search term is not obtained, which indicates that the search term in the search request is not a search term of hot content, the search request belongs to a search request for non-hot content. The second database is queried according to the search term in the search request to obtain the cache content of the second search result. It is determined whether the cache content of the second search result is valid. If the cache content of the second search result is valid, the information in the cache content of the second search result is taken as a fourth search request result. If the cache content of the second search result is not valid, the search request is forwarded to a search engine, a fifth search request result is obtained and the fifth search request result is updated into the second database.

It should be noted that the process of conducting a search request for non-hot content is identical to S106, S107 and S108 in the process of conducting a search request for hot content and will not be described repeatedly here.

Optionally, after taking information in the cache content of the first search result as a first search request result, the method for updating search cache according to the embodiment of the present application further comprises:

returning the first search request result to a search request client; or after obtaining the second search request result, the method for updating search cache according to the embodiment of the present application further comprises:

returning the second search request result to a search request client; or after obtaining the third search request result, the method for updating search cache according to the embodiment of the present application further comprises:

returning the third search request result to a search request client; or after taking information in the cache content of the second search result as a fourth search request result, the method for updating search cache according to the embodiment of the present application further comprises:

returning the fourth search request result to a search request client; or after obtaining the fifth search request result, the method for updating search cache according to the embodiment of the present application further comprises:

returning the fifth search request result to a search request client.

The search request client herein is a client that sends a search request.

In an embodiment of the present application, after obtaining a first search request result, a second search request result, a third search request result, a fourth search request result or a fifth search request result, a server that processes a search request returns the first search request result, the second search request result, the third search request result, the fourth search request result or the fifth search request result to a search request client, so as to enable users to view the specific search results.

Optionally, before extracting a first search term corresponding to information of the hot content and updating the first search term into a first database, the method for updating search cache according to the embodiment of the present application further comprises:

receiving a message queue of the hot content, and updating the search term corresponding to the message queue into the first database.

It should be noted that, the first database is established in advance, and hot content is different in different periods. The server that processes a search request receives a message queue of hot content according to the current hot content and updates the search term in the message queue to the first database, thereby forming the first database.

Optionally, in the method for updating search cache according to the embodiment of the present application, the step of determining that the second search term is valid comprises the following steps.

Firstly, a first difference between a timestamp of obtaining the second search term and a timestamp of writing the second search term is determined.

The timestamp of obtaining the second search term herein is a timestamp of obtaining the second search term from the first database according to the search request, and the timestamp of writing the second search term herein is a timestamp of writing the second search term into the first database.

Secondly, if the first difference is smaller than a first preset valid period, it is determined that the second search term is valid.

The first preset valid period herein is a valid period for a search term of hot content.

The step of determining whether the cache content of the first search result is valid comprises the following steps.

Firstly, a second difference between a timestamp of obtaining the cache content of the first search result and a timestamp of writing the cache content of the first search result is determined.

The timestamp of obtaining the cache content of the first search result herein is a timestamp of obtaining the cache content of the first search result from the second database according to the second search term, and the timestamp of writing the cache content of the first search result herein is a timestamp of writing the cache content of the first search result into the second database.

Secondly, it is determined whether the cache content of the first search result is valid according to whether the second difference is smaller than a second preset valid period.

The second preset valid period herein is a valid period for cache content of hot content.

If the second difference is smaller than the second preset valid period, it is determined that the cache content of the first search result is valid, and if the second difference is larger than or equal to the second preset valid period, it is determined that the cache content of the first search result is not valid.

The second preset valid period herein is smaller than the first preset valid period.

It should be noted that, the timestamp of obtaining the second search term refers to a current timestamp in the processing of a search request, and the first difference between the current timestamp and the timestamp of writing the second search term is the existence time of the second search term. If the first difference is smaller than the first preset valid period, which indicates that the second search term is still within the valid period, the second search term is determined to be valid. Wherein, the first preset valid period can be 10 minutes, 5 minutes or the like.

Similarly, cache content of a search result has a corresponding write time, and the timestamp of obtaining the cache content of the first search result refers to a current timestamp in the processing of a search request. Of course, the current timestamp is different from the timestamp of obtaining the second search term. The second difference between the current timestamp and the timestamp of writing the cache content of the first search result is the existence time of the cache content of the first search result. If the existence time is shorter than the second preset valid period, it is indicated that the cache content of the first search result is still within the valid period, i.e., has not passed the valid period yet. Wherein, the second preset valid period can be 8 minutes, 3 minutes or the like.

Generally, the first preset valid period is much longer than the second preset valid period, i.e., the valid time of a search term is much longer than that of cache content. If a search term is still within the valid period, cache content of information corresponding to the search term may be within the valid period or has already passed the valid period. If cache content of the search result corresponding to the search term has already passed the valid period, the latest information of the hot content is obtained through a search engine and cache content of the search result corresponding to the search term is updated in time, which improves update speed of hot content. If a search term has already passed the valid period, the cache content of information corresponding to the search term certainly has already passed the valid period. At this point, the latest information of the hot content may be obtained through a search engine and the cache content of the search result corresponding to the search term may be updated; or the latest information of the hot content may be not obtained through a search engine and the cache content of the search result corresponding to the search term may be not updated. In this way, it is ensured that cache content of a search result of hot content is updated in time during the valid period of a search term of hot content.

Optionally, in the method for updating search cache according to the embodiment of the present application, the step of determining that the second search term is not valid comprises the following steps.

Firstly, a first difference between a timestamp of obtaining the second search term and a timestamp of writing the second search term is determined.

Secondly, if the first difference is larger than or equal to a first preset valid period, it is determined that the second search term is not valid.

In the embodiment of the present application, the step of determining that the second search term is not valid is similar with the step of determining that the second search term is valid. The timestamp of obtaining the second search term refers to the current timestamp in the processing of a search request, and the first difference between the current timestamp and the timestamp of writing the second search term is the existence time of the second search term. If the first difference is larger than or equal to the first preset valid period, which indicates that the second search term has already passed the valid period, it is determined that the second search term is not valid.

Optionally, in the method for updating search cache according to the embodiment of the present application, the step of determining that the cache content of a second search result is valid comprises the following steps.

Firstly, a third difference between a timestamp of obtaining cache content of the second search result and a timestamp of writing the cache content of the second search result is determined.

The timestamp of obtaining cache content of the second search result herein is a timestamp of obtaining the cache content of the second search result from the second database according to a search request, and the timestamp of writing the cache content of the second search result herein is a timestamp of writing the cache content of the second search result into the second database.

Secondly, it is determined whether the cache content of the second search result is valid according to whether the third difference is smaller than a third preset valid period.

The third preset valid period herein is the valid time of cache content of non-hot content; the third preset valid period is longer than the second preset valid period and shorter than the first preset valid period.

Specifically, the step of determining whether the cache content of the second search result is valid is identical to the step of determining whether the cache content of the first search result is valid, and will not be described repeatedly here.

Figure 4:
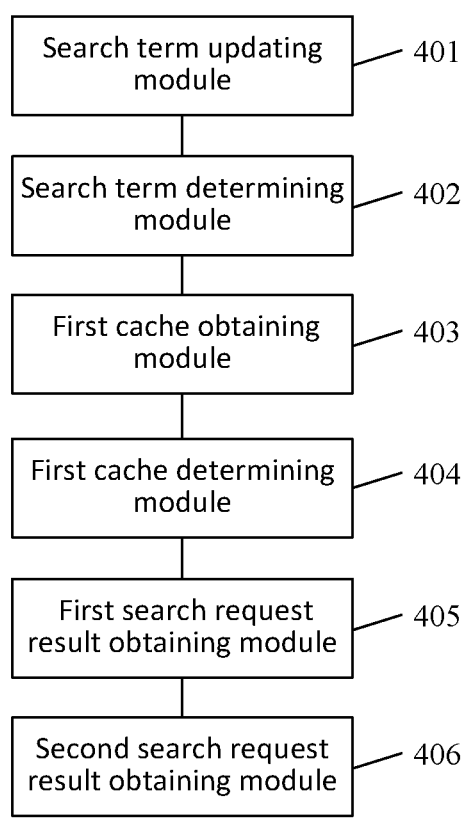
FIG. 4 is a structure diagram of an apparatus for updating search cache according to an embodiment of the present application.

Corresponding to the above embodiments of the method, an embodiment of the present application further provides an apparatus for updating search cache. Reference is made to FIG. 4, and FIG. 4 is a structure diagram of an apparatus for updating search cache according to an embodiment of the present application. The apparatus comprises:

a search term updating module 401, used to, when hot content is updated, extract a first search term corresponding to information of the hot content, and update the first search term into a pre-established first database, wherein, the first database stores a search term of hot content;

a search term determining module 402, used to, when receiving a search request, query the first database according to a search term in the search request and determine whether a second search term is obtained;

a first cache obtaining module 403, used to, when the second search term is obtained and determined to be valid, query a pre-established second database according to the second search term to obtain cache content of a first search result, wherein, the second database stores cache content of a search result;

a first cache determining module 404, used to determine whether the cache content of the first search result is valid;

a first search request result obtaining module 405, used to, when the first cache determining module determines that the cache content of the first search result is valid, take information in the cache content of the first search result as a first search request result; and a second search request result obtaining module 406, used to, when the first cache determining module determines that the cache content of the first search result is not valid, forward the search request to a search engine, obtain a second search request result and update the second search request result into the second database.

It can be seen that by using the apparatus for updating search cache according to the embodiment of the present application, a search term of hot content is updated into a first database in time; when a search request is received, the first database is queried according to the search term in the search request, wherein the valid time of a search term of hot content is larger than that of cache content of a search result of hot content, and thus when a second search term obtained is determined to be valid, cache content of information corresponding to the second search term may be still within the valid period or has already passed the valid period; a pre-established second database is queried according to the second search term to obtain cache content of a first search result; when cache content of the first search result is valid, information in cache content of the first search result is taken as a first search request result; and when cache content of the first search result is not valid, the search request is forwarded to a search engine, a second search request result is obtained and the second search request result is updated into the second database, which ensures that cache content of hot content is updated in time. In this way, since the valid time of a search term of hot content is larger than that of cache content of a search result of hot content, by applying the apparatus for updating search cache according to the embodiment of the present application, the update speed of hot content can be improved such that information of hot content is newer and it is convenient for users to view the latest information.

It should be noted that, the apparatus according to the embodiment of the present application is an apparatus applying the method for updating search cache described above, thus all embodiments of the method for updating search cache described above are applicable to this apparatus and can achieve same or similar beneficial effects.

Figure 5:
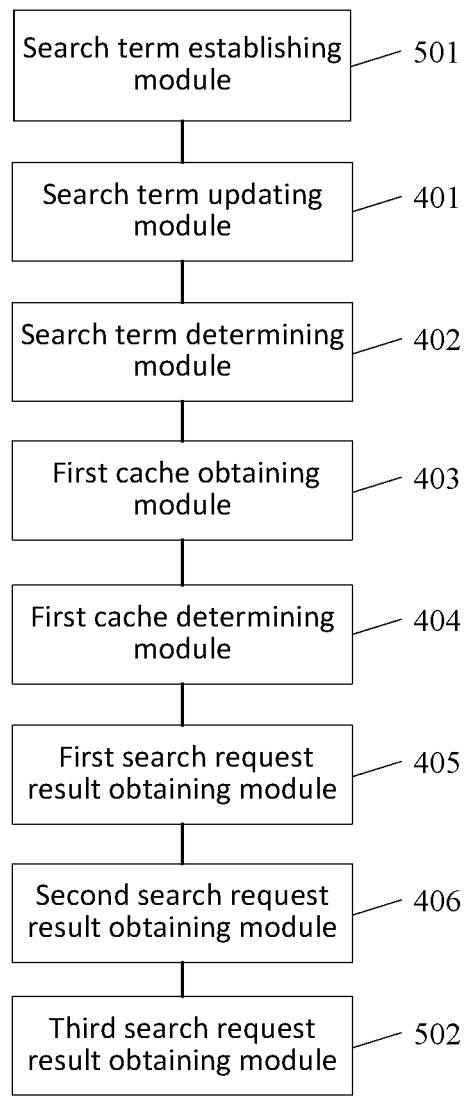
FIG. 5 is another structure diagram of an apparatus for updating search cache according to an embodiment of the present application.

Referring to FIG. 5, which is another structure diagram of an apparatus for updating search cache according to an embodiment of the present application, on the basis of the embodiment of FIG. 4, the apparatus for updating search cache according to the embodiment of the present application further comprises:

a search term establishing module 501, used to receive a message queue of the hot content and update a search term corresponding to the message queue into the first database;

a third search request result obtaining module 502, used to, when the second search term is obtained and determined to be not valid, forward the search request to the search engine, obtain a third search request result and update the third search request result into the second database.

Figure 6:
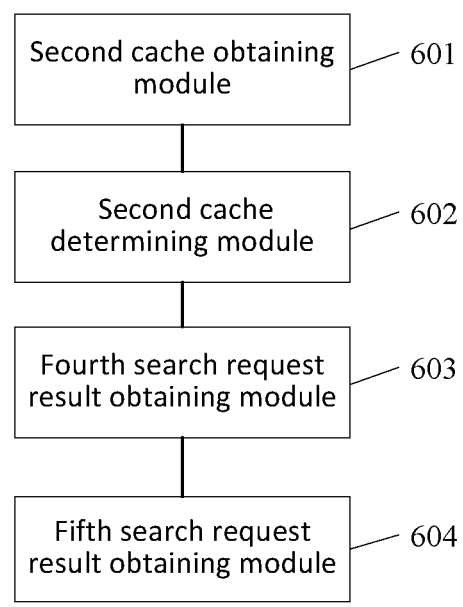
FIG. 6 is a partial structure diagram of an apparatus for updating search cache according to an embodiment of the present application.

Reference is made to FIG. 6, and FIG. 6 is a structure diagram of a portion of an apparatus for updating search cache according to an embodiment of the present application. On the basis of the embodiment of FIG. 5, the apparatus further comprises:

a second cache obtaining module 601, used to, when the search term determining module 402 determines that the second search term is not obtained, query the second database according to the search request to obtain cache content of a second search result;

a second cache determining module 602, used to determine whether the cache content of the second search result is valid;

a fourth search request result obtaining module 603, used to, when the second cache determining module determines that the cache content of the second search result is valid, takes information in the cache content of the second search result as a fourth search request result; and a fifth search request result obtaining module 604, used to, when the second cache determining module determines that the cache content of the second search result is not valid, forward the search request to the search engine, obtain a fifth search request result and update the fifth search request result into the second database.

Optionally, in the apparatus for updating search cache according to the embodiment of the present application, the first cache obtaining module 403 comprises:

a first difference determining sub-module, used to determine a first difference between a timestamp of obtaining the second search term and a timestamp of writing the second search term; and a second cache validity determining sub-module, used to determine that the second search term is valid if the first difference is smaller than a first preset valid period.

The first cache determining module 404 comprises:

a second difference determining sub-module, used to determine a second difference between a timestamp of obtaining the cache content of the first search result and a timestamp of writing the cache content of the first search result;

a first cache validity determining sub-module, used to determine whether the cache content of the first search result is valid according to whether the second difference is smaller than a second preset valid period.

Optionally, in the apparatus for updating search cache according to the embodiment of the present application, the third search request result obtaining module 502 comprises:

a first difference determining sub-module, used to determine a first difference between a timestamp of obtaining the second search term and a timestamp of writing the second search term; and a second search term invalidity determining sub-module, used to determine that the second search term is not valid if the first difference is larger than or equal to a first preset valid period.

Optionally, in the apparatus for updating search cache according to the embodiment of the present application, the second cache determining module 602 comprises:

a third difference determining sub-module, used to determine a third difference between a timestamp of obtaining the cache content of the second search result and a timestamp of writing the cache content of the second search result; and a second cache validity determining sub-module, used to determine whether the cache content of the second search result is valid according to whether the third difference is smaller than a third preset valid period.

Optionally, the apparatus for updating search cache according to the embodiment of the present application further comprises:

a first search request result returning module, used to return the first search request result to a search request client; or a second search request result returning module, used to return the second search request result to a search request client; or a third search request result returning module, used to return the third search request result to a search request client; or a fourth search request result returning module, used to return the fourth search request result to a search request client; or a fifth search request result returning module, used to return the fifth search request result to a search request client.

An embodiment of the present application further provide an electronic device, which comprises a processor, a communication interface, a memory and a communication bus, wherein, the processor, the communication interface and the memory communicate with each other via the communication bus;

the memory is used to store an application program; and the processor is used to execute the application program stored in the memory, so as to perform the method for updating search cache. Wherein, the method for updating search cache comprises:

when hot content is updated, extracting a first search term corresponding to information of the hot content, and updating the first search term into a pre-established first database, wherein, the first database stores a search term of hot content;

when a search request is received, querying the first database according to a search term in the search request and determining whether a second search term is obtained;

when the second search term is obtained and determined to be valid, querying a pre-established second database according to the second search term to obtain cache content of a first search result, wherein, the second database stores cache content of a search result; and determining whether the cache content of the first search result is valid; if the cache content of the first search result is valid, taking information in the cache content of the first search result as a first search request result; and if the cache content of the first search result is not valid, forwarding the search request to a search engine, obtaining a second search request result and updating the second search request result into the second database.

Optionally, before extracting a first search term corresponding to information of the hot content and updating the first search term into a first database, the method further comprises:

receiving a message queue of the hot content, and updating a search term corresponding to the message queue into the first database.

Optionally, determining that the second search term is valid comprises:

determining a first difference between a timestamp of obtaining the second search term and a timestamp of writing the second search term; and if the first difference is smaller than a first preset valid period, determining that the second search term is valid; and determining whether the cache content of the first search result is valid comprises:

determining a second difference between a timestamp of obtaining the cache content of the first search result and a timestamp of writing the cache content of the first search result; and determining whether the cache content of the first search result is valid according to whether the second difference is smaller than a second preset valid period.

Optionally, after querying a pre-established first database according to a search term in the search request and determining whether a second search term is obtained, the method further comprises:

when the second search term is obtained and determined to be not valid, forwarding the search request to the search engine, obtaining a third search request result and updating the third search request result into the second database.

Optionally, the method for updating search cache further comprises:

when the second search term is not obtained, querying the second database according to the search request to obtain cache content of a second search result and determining whether the cache content of the second search result is valid;

if the cache content of the second search result is valid, taking information in the cache content of the second search result as a fourth search request result;

if the cache content of the second search result is not valid, forwarding the search request to the search engine, obtaining a fifth search request result and updating the fifth search request result into the second database.

Optionally, determining whether the cache content of the second search result is valid comprises:

determining a third difference between a timestamp of obtaining the cache content of the second search result and a timestamp of writing the cache content of the second search result;

determining whether the cache content of the second search result is valid according to whether the third difference is smaller than a third preset valid period.

Optionally, after taking information in the cache content of the first search result as a first search request result, the method further comprises:

returning the first search request result to a search request client; or after obtaining the second search request result, the method further comprises:

returning the second search request result to a search request client; or after obtaining the third search request result, the method further comprises:

returning the third search request result to a search request client; or after taking information in the cache of the second search result as a fourth search request result, the method further comprises:

returning the fourth search request result to a search request client; or after obtaining the fifth search request result, the method further comprises:

returning the fifth search request result to a search request client.

It can be seen that in the embodiment of the present application, a search term of hot content is updated into a first database in time; when a search request is received, the first database is queried according to the search term in the search request, wherein the valid time of a search term of hot content is larger than that of cache content of a search result of hot content, and thus when a second search term obtained is determined to be valid, cache content of the search result corresponding to the second search term may be still within the valid period or has already passed the valid period, and cache content of information corresponding to the second search term may be still within the valid period or has already passed the valid period; a pre-established second database is queried according to the second search term to obtain cache content of a first search result; when cache content of the first search result is valid, information in cache content of the first search result is taken as a first search request result; and when cache content of the first search result is not valid, the search request is forwarded to a search engine, a second search request result is obtained and the second search request result is updated into the second database, which ensures that cache content of hot content is updated in time. In this way, since the valid time of a search term of hot content is larger than that of cache content of a search result of hot content, by applying the embodiment of the present application, the update speed of hot content can be improved such that information of hot content is newer and it is convenient for users to view the latest information.

A communication interface is used for communication between the electronic device described above and other devices.

The communication bus described above can be PCI (Peripheral Component Interconnect) bus or EISA (Extended Industry Standard Architecture) bus, or the like. The communication bus can be divided into an address bus, a data bus, a control bus and so on.

The memory may include RAM (Random Access Memory), and may also include NVM (Non-Volatile Memory), e.g., at least one disk memory. Moreover, the memory can also be at least one memory device located away from the aforementioned processor.

The processor can be a general-purpose processor, including CPU, NP (Network Processor) and the like, and can also be DSP (Digital Signal Processing), ASIC (Application Specific Integrated Circuit), FPGA (Field-Programmable Gate Array) or other programmable logic devices, discrete gates or transistor logic devices, discrete hardware components.

In another embodiment provided by the present application, a storage medium is provided and used to store an application program which causes a computer to perform the method for updating search cache according to any one of the embodiments described above when being executed. Wherein, the method for updating search cache comprises:

when hot content is updated, extracting a first search term corresponding to information of the hot content, and updating the first search term into a pre-established first database, wherein, the first database stores a search term of hot content;

when a search request is received, querying the first database according to a search term in the search request and determining whether a second search term is obtained;

when the second search term is obtained and determined to be valid, querying a pre-established second database according to the second search term to obtain cache content of a first search result, wherein, the second database stores cache content of a search result; and determining whether the cache content of the first search result is valid; if the cache content of the first search result is valid, taking information in the cache content of the first search result as a first search request result; and if the cache content of the first search result is not valid, forwarding the search request to a search engine, obtaining a second search request result and updating the second search request result into the second database.

Optionally, before extracting a first search term corresponding to information of the hot content and updating the first search term into a first database, the method further comprises:

receiving a message queue of the hot content, and updating the search term corresponding to the message queue into the first database.

Optionally, determining that the second search term is valid comprises:

determining a first difference between a timestamp of obtaining the second search term and a timestamp of writing the second search term;

if the first difference is smaller than a first preset valid period, determining that the second search term is valid; and determining whether the cache content of the first search result is valid comprises:

determining a second difference between a timestamp of obtaining the cache content of the first search result and a timestamp of writing the cache content of the first search result; and determining whether the cache content of the first search result is valid according to whether the second difference is smaller than a second preset valid period.

Optionally, after querying a pre-established first database according to a search term in the search request and determining whether a second search term is obtained, the method further comprises:

when the second search term is obtained and determined to be not valid, forwarding the search request to the search engine, obtaining a third search request result and updating the third search request result into the second database.

Optionally, the method for updating search cache further comprises:

when the second search term is not obtained, querying the second database according to the search request to obtain cache content of a second search result and determining whether the cache content of the second search result is valid;

if the cache content of the second search result is valid, taking information in the cache content of the second search result as a fourth search request result;

if the cache content of the second search result is not valid, forwarding the search request to the search engine, obtaining a fifth search request result and updating the fifth search request result into the second database.

Optionally, determining whether the cache content of the second search result is valid comprises:

determining a third difference between a timestamp of obtaining the cache content of the second search result and a timestamp of writing the cache content of the second search result; and determining whether the cache content of the second search result is valid according to whether the third difference is smaller than a third preset valid period.

Optionally, after taking information in the cache content of the first search result as a first search request result, the method further comprise:

returning the first search request result to a search request client; or after obtaining the second search request result, the method further comprises:

returning the second search request result to a search request client; or after obtaining the third search request result, the method further comprises:

returning the third search request result to a search request client; or after taking information in the cache content of the second search result as a fourth search request result, the method further comprises:

returning the fourth search request result to a search request client; or after obtaining the fifth search request result, the method further comprises:

returning the fifth search request result to a search request client.

It can be seen that in the embodiment of the present application, a search term of hot content is updated into a first database in time; when a search request is received, the first database is queried according to the search term in the search request, wherein the valid time of a search term of hot content is larger than that of cache content of a search result of hot content, and thus when a second search term obtained is determined to be valid, cache content of the search result corresponding to the second search term may be still within the valid period or has already passed the valid period, and cache content of information corresponding to the second search term may be still within the valid period or has already passed the valid period; a pre-established second database is queried according to the second search term to obtain cache content of a first search result; when cache content of the first search result is valid, information in cache content of the first search result is taken as a first search request result; and when cache content of the first search result is not valid, the search request is forwarded to a search engine, a second search request result is obtained and the second search request result is updated into the second database, which ensures that cache content of hot content is updated in time. In this way, since the valid time of a search term of hot content is larger than that of cache content of a search result of hot content, by applying the embodiment of the present application, the update speed of hot content can be improved such that information of hot content is newer and it is convenient for users to view the latest information.

In another embodiment provided by the present application, an application program is provided which is a computer program product comprising instructions. The application program is used to cause a computer to perform the method for updating search cache according to any one of the embodiments described above when being executed. Wherein, the method for updating search cache comprises:

when hot content is updated, extracting a first search term corresponding to information of the hot content, and updating the first search term into a pre-established first database, wherein, the first database stores a search term of hot content;

when a search request is received, querying the first database according to a search term in the search request and determining whether a second search term is obtained;

when the second search term is obtained and determined to be valid, querying a pre-established second database according to the second search term to obtain cache content of a first search result, wherein, the second database stores cache content of a search result; and determining whether the cache content of the first search result is valid; if the cache content of the first search result is valid, taking information in the cache content of the first search result as a first search request result; if the cache content of the first search result is not valid, forwarding the search request to a search engine, obtaining a second search request result and updating the second search request result into the second database.

Optionally, before extracting a first search term corresponding to information of the hot content and updating the first search term into a first database, the method further comprises:

receiving a message queue of the hot content, and updating the search term corresponding to the message queue into the first database.

Optionally, determining that the second search term is valid comprises:

determining a first difference between a timestamp of obtaining the second search term and a timestamp of writing the second search term;

if the first difference is smaller than a first preset valid period, determining that the second search term is valid; and determining whether the cache content of the first search result is valid comprises:

determining a second difference between a timestamp of obtaining the cache content of the first search result and a timestamp of writing the cache content of the first search result; and determining whether the cache content of the first search result is valid according to whether the second difference is smaller than a second preset valid period.

Optionally, after querying a pre-established first database according to a search term in the search request and determining whether a second search term is obtained, the method further comprises:

when the second search term is obtained and determined to be not valid, forwarding the search request to the search engine, obtaining a third search request result and updating the third search request result into the second database.

Optionally, the method for updating search cache further comprises:

when the second search term is not obtained, querying the second database according to the search request to obtain cache content of a second search result and determining whether the cache content of the second search result is valid;

if the cache content of the second search result is valid, taking information in the cache content of the second search result as a fourth search request result;

if the cache content of the second search result is not valid, forwarding the search request to the search engine, obtaining a fifth search request result and updating the fifth search request result into the second database.

Optionally, determining whether the cache content of the second search result is valid comprises:

determining a third difference between a timestamp of obtaining the cache content of the second search result and a timestamp of writing the cache content of the second search result; and determining whether the cache content of the second search result is valid according to whether the third difference is smaller than a third preset valid period.

Optionally, after taking information in the cache content of the first search result as a first search request result, the method further comprises:

returning the first search request result to a search request client; or after obtaining the second search request result, the method further comprises:

returning the second search request result to a search request client; or after obtaining the third search request result, the method further comprises:

returning the third search request result to a search request client; or after taking information in the cache content of the second search result as a fourth search request result, the method further comprises:

returning the fourth search request result to a search request client; or after obtaining the fifth search request result, the method further comprises:

returning the fifth search request result to a search request client.

It can be seen that in the embodiment of the present application, a search term of hot content is updated into a first database in time; when a search request is received, the first database is queried according to the search term in the search request, wherein the valid time of a search term of hot content is larger than that of cache content of a search result of hot content, and thus when a second search term obtained is determined to be valid, cache content of the search result corresponding to the second search term may be still within the valid period or has already passed the valid period, and cache content of information corresponding to the second search term may be still within the valid period or has already passed the valid period; a pre-established second database is queried according to the second search term to obtain cache content of a first search result; when cache content of the first search result is valid, information in cache content of the first search result is taken as a first search request result; and when cache content of the first search result is not valid, the search request is forwarded to a search engine, a second search request result is obtained and the second search request result is updated into the second database, which ensures that cache content of hot content is updated in time. In this way, since the valid time of a search term of hot content is larger than that of cache content of a search result of hot content, by applying the embodiment of the present application, the update speed of hot content can be improved such that information of hot content is newer and it is convenient for users to view the latest information.

The above embodiments can be wholly or partly implemented by software, hardware, firmware, or any combination thereof. When implemented with software, they can be implemented in whole or in part in the form of a computer program product. The computer program product includes one or more computer instructions. The flows or functions in accordance with embodiments of the present application can be implemented by loading and executing the computer program instructions on a computer. The computer can be a general-purpose computer, a dedicated computer, a computer network, or other programmable devices. The computer instructions can be stored in a computer readable storage medium, or can be transmitted from one computer readable storage medium to another computer readable storage medium. For example, the computer instructions can be transmitted from a website, a computer, a server or a data center through a wired (e.g., a coaxial cable, an optical fiber, a digital subscriber line (DSL)) or wireless (e.g., infrared, wireless, microwave, etc.) manner to another web site, computer, server or data center. The computer readable storage medium can be any available medium to which a computer can access, or a data storage device including a server or a data center integrated by one or more available media. The available medium may be a magnetic medium (such as a floppy disk, a hard disk, a tape), an optical medium (such as DVD), or a semiconductor medium (such as a solid state disk (SSD)) or the like.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

All embodiments in the description are described in a correlated manner, and identical or similar parts in various embodiments can be referred to one another. The description for each embodiment focuses on the differences with other embodiments. Especially, embodiments of an apparatus for updating search cache, an electronic device, an application program and a storage medium are briefly described and reference can be made to the description of the embodiments of a method for updating search cache for its related contents, since the embodiments thereof are substantially similar to those of the method for updating search cache.

The embodiments described above are just preferable embodiments of the present application, and not indented to limit the protection scope of the present application. Any modifications, alternatives, improvements or the like within the spirit and principle of the present application shall fall into the protection scope of the present application.

The invention claimed is:

1. A method for updating search cache, comprising:
when hot content is updated, extracting a first search term corresponding to information of the hot content, and updating the first search term into a pre-established first database, wherein, the hot content is preset by means of term segmentation or determined according to update frequency, and the first database stores a search term of hot content;
wherein cache content of a search result for the search term of hot content is stored in a pre-established second database, wherein a valid time of the search term of hot content in the first database is set to be longer than a valid time of the cache content of the search result for the search term of hot content in the second database;
when a search request is received, querying the first database according to a search term in the search request and determining whether a second search term identical to the search term in the search request is obtained, to determine whether the search request is for hot content or for non-hot content, wherein when the second search term is obtained, it is indicated that the search request is for hot content; otherwise, it is indicated that the search request is for non-hot content;
when the second search term is obtained and determined to be valid, querying the second database according to the second search term to obtain cache content of a first search result, wherein, when the second search term is determined to be valid, it is indicated that the second search term is still within a valid period and information corresponding to this second search term is still hot content; and
determining whether the cache content of the first search result is valid; if the cache content of the first search result is valid, taking information in the cache content of the first search result as a first search request result; if the cache content of the first search result is not valid, forwarding the search request to a search engine, obtaining a second search request result and updating the second search request result into the second database;
wherein, determining that the second search term is valid comprises:
determining a first difference between a timestamp of obtaining the second search term and a timestamp of writing the second search term;
if the first difference is smaller than a first preset valid period, determining that the second search term is valid; and
determining whether the cache content of the first search result is valid comprises:
determining a second difference between a timestamp of obtaining the cache content of the first search result and a timestamp of writing the cache content of the first search result;
determining whether the cache content of the first search result is valid according to whether the second difference is smaller than a second preset valid period.

2. The method for updating search cache according to claim 1, wherein, before extracting a first search term corresponding to information of the hot content and updating the first search term into a first database, the method further comprises:
receiving a message queue of the hot content, and updating a search term corresponding to the message queue into the first database.

3. The method for updating search cache according to claim 1, wherein, the method further comprises:
when the second search term is obtained and determined to be not valid, forwarding the search request to the search engine, obtaining a third search request result and updating the third search request result into the second database.

4. The method for updating search cache according to claim 3, wherein, the method further comprises:
when the second search term is not obtained, querying the second database according to the search request to obtain cache content of a second search result and determining whether the cache content of the second search result is valid;

if the cache content of the second search result is valid, taking information in the cache content of the second search result as a fourth search request result;
if the cache content of the second search result is not valid, forwarding the search request to the search engine, obtaining a fifth search request result and updating the fifth search request result into the second database.

5. The method for updating search cache according to claim 4, wherein, determining whether the cache content of the second search result is valid comprises:
determining a third difference between a timestamp of obtaining the cache content of the second search result and a timestamp of writing the cache content of the second search result; and
determining whether the cache content of the second search result is valid according to whether the third difference is smaller than a third preset valid period.

6. The method for updating search cache according to claim 4, wherein, after taking information in the cache content of the first search result as a first search request result, the method further comprises:
returning the first search request result to a search request client; or
after obtaining the second search request result, the method further comprises:
returning the second search request result to a search request client; or
after obtaining the third search request result, the method further comprises:
returning the third search request result to a search request client; or
after taking information in the cache content of the second search result as a fourth search request result, the method further comprises:
returning the fourth search request result to a search request client; or
after obtaining the firth search request result, the method further comprises:
returning the fifth search request result to a search request client.

7. An electronic device, comprising at least one processor and a memory, wherein,
the memory is used to store an application program; and
the processor is used to execute the application program stored in the memory, so as to perform a method for updating search cache, comprising:
when hot content is updated, extracting a first search term corresponding to information of the hot content, and updating the first search term into a pre-established first database, wherein, the hot content is preset by means of term segmentation or determined according to update frequency, and the first database stores a search term of hot content;
wherein cache content of a search result for the search term of hot content is stored in a pre-established second database, and wherein a valid time of the search term of hot content in the first database is set to be longer than a valid time of the cache content of the search result for the search term of hot content in the second database;
when a search request is received, querying the first database according to a search term in the search request and determining whether a second search term identical to the search term in the search request is obtained, to determine whether the search request is for hot content or for non-hot content, wherein when the second search term is obtained, it is indicated that the search request is for hot content; otherwise, it is indicated that the search request is for non-hot content;
when the second search term is obtained and determined to be valid, querying the second database according to the second search term to obtain cache content of a first search result, wherein, when the second search term is determined to be valid, it is indicated that the second search term is still within a valid period and information corresponding to this second search term is still hot content; and
determining whether the cache content of the first search result is valid; if the cache content of the first search result is valid, taking information in the cache content of the first search result as a first search request result; if the cache content of the first search result is not valid, forwarding the search request to a search engine, obtaining a second search request result and updating the second search request result into the second database;
wherein, determining that the second search term is valid comprises:
determining a first difference between a timestamp of obtaining the second search term and a timestamp of writing the second search term;
if the first difference is smaller than a first preset valid period, determining that the second search term is valid; and
determining whether the cache content of the first search result is valid comprises:
determining a second difference between a timestamp of obtaining the cache content of the first search result and a timestamp of writing the cache content of the first search result;
determining whether the cache content of the first search result is valid according to whether the second difference is smaller than a second preset valid period.

8. A non-transitory computer readable storage medium for storing an application program, which is used to perform a method for updating search cache when being executed, the method comprising:
when hot content is updated, extracting a first search term corresponding to information of the hot content, and updating the first search term into a pre-established first database, wherein, the hot content is preset by means of term segmentation or determined according to update frequency, and the first database stores a search term of hot content;
wherein cache content of a search result for the search term of hot content is stored in a pre-established second database, and wherein a valid time of the search term of hot content in the first database is set to be longer than a valid time of the cache content of the search result for the search term of hot content in the second database;
when a search request is received, querying the first database according to a search term in the search request and determining whether a second search term identical to the search term in the search request is obtained, to determine whether the search request is for hot content or for non-hot content, wherein when the second search term is obtained, it is indicated that the search request is for hot content; otherwise, it is indicated that the search request is for non-hot content;
when the second search term is obtained and determined to be valid, querying the second database according to the second search term to obtain cache content of a first search result, wherein, when the second search term is determined to be valid, it is indicated that the second search term is still within a valid period and information corresponding to this second search term is still hot content; and determining whether the cache content of the first search result is valid; if the cache content of the first search result is valid, taking information in the cache content of the first search result as a first search request result; if the cache content of the first search result is not valid, forwarding the search request to a search engine, obtaining a second search request result and updating the second search request result into the second database;

wherein, determining that the second search term is valid comprises:

determining a first difference between a timestamp of obtaining the second search term and a timestamp of writing the second search term;

if the first difference is smaller than a first preset valid period, determining that the second search term is valid; and determining whether the cache content of the first search result is valid comprises:

determining a second difference between a timestamp of obtaining the cache content of the first search result and a timestamp of writing the cache content of the first search result;

determining whether the cache content of the first search result is valid according to whether the second difference is smaller than a second preset valid period.

9. The electronic device according to claim 7, wherein, before extracting a first search term corresponding to information of the hot content and updating the first search term into a first database, the method further comprises:

receiving a message queue of the hot content, and updating a search term corresponding to the message queue into the first database.

10. The electronic device according to claim 7, wherein, the method further comprises:

when the second search term is obtained and determined to be not valid, forwarding the search request to the search engine, obtaining a third search request result and updating the third search request result into the second database.

11. The electronic device according to claim 10, wherein, the method further comprises:

when the second search term is not obtained, querying the second database according to the search request to obtain cache content of a second search result and determining whether the cache content of the second search result is valid;

if the cache content of the second search result is valid, taking information in the cache content of the second search result as a fourth search request result;

if the cache content of the second search result is not valid, forwarding the search request to the search engine, obtaining a fifth search request result and updating the fifth search request result into the second database.

12. The electronic device according to claim 11, wherein, determining whether the cache content of the second search result is valid comprises:

determining a third difference between a timestamp of obtaining the cache content of the second search result and a timestamp of writing the cache content of the second search result; and determining whether the cache content of the second search result is valid according to whether the third difference is smaller than a third preset valid period.

13. The electronic device according to claim 11, wherein, after taking information in the cache content of the first search result as a first search request result, the method further comprises:

returning the first search request result to a search request client; or after obtaining the second search request result, the method further comprises:

returning the second search request result to a search request client; or after obtaining the third search request result, the method further comprises:

returning the third search request result to a search request client; or after taking information in the cache content of the second search result as a fourth search request result, the method further comprises:

returning the fourth search request result to a search request client; or after obtaining the firth search request result, the method further comprises:

returning the fifth search request result to a search request client.

14. The non-transitory computer readable storage medium according to claim 8, wherein, before extracting a first search term corresponding to information of the hot content and updating the first search term into a first database, the method further comprises:

receiving a message queue of the hot content, and updating a search term corresponding to the message queue into the first database.

15. The non-transitory computer readable storage medium according to claim 8, wherein, the method further comprises:

when the second search term is obtained and determined to be not valid, forwarding the search request to the search engine, obtaining a third search request result and updating the third search request result into the second database.

16. The non-transitory computer readable storage medium according to claim 15, wherein, the method further comprises:

when the second search term is not obtained, querying the second database according to the search request to obtain cache content of a second search result and determining whether the cache content of the second search result is valid;

if the cache content of the second search result is valid, taking information in the cache content of the second search result as a fourth search request result;

if the cache content of the second search result is not valid, forwarding the search request to the search engine, obtaining a fifth search request result and updating the fifth search request result into the second database.

17. The non-transitory computer readable storage medium according to claim 16, wherein, determining whether the cache content of the second search result is valid comprises:

determining a third difference between a timestamp of obtaining the cache content of the second search result and a timestamp of writing the cache content of the second search result; and determining whether the cache content of the second search result is valid according to whether the third difference is smaller than a third preset valid period.

18. The non-transitory computer readable storage medium according to claim 16, wherein, after taking information in the cache content of the first search result as a first search request result, the method further comprises:
returning the first search request result to a search request client; or
after obtaining the second search request result, the method further comprises:
returning the second search request result to a search request client; or
after obtaining the third search request result, the method further comprises:
returning the third search request result to a search request client; or
after taking information in the cache content of the second search result as a fourth search request result, the method further comprises:
returning the fourth search request result to a search request client; or
after obtaining the firth search request result, the method further comprises:
returning the fifth search request result to a search request client.

\* \* \* \* \*